United States Patent Office 3,763,245  
Patented Oct. 2, 1973

3,763,245  
ALLYLIC TERPENIC ALCOHOL PRODUCTION  
Bernard Thomas Dudley Sully, Ewell, Surrey, England, assignor to Bush Boake Allen Limited, London, England  
No Drawing. Filed Apr. 30, 1969, Ser. No. 820,641  
Claims priority, application Great Britain, May 17, 1968, 23,647/68  
Int. Cl. C07c 33/02  
U.S. Cl. 260—631.5     20 Claims

ABSTRACT OF THE DISCLOSURE $C_{10}$ allylic terpenic halides are converted to the corresponding $C_{10}$ allylic terpenic alcohols by direct aqueous hydrolysis in an aqueous hydrotropic solution of a benzene or alkylbenzene sulphonate salt wherein each of any alkyl groups present does not contain more than 4 carbon atoms, preferably sodium xylene sulphonate. By-product formation may thereby be minimised.

---

This invention relates to the preparation of allylic terpenic alcohols, by which is meant alcohols having an essential ten carbon atom monoterpenoid structure and in which an alcoholic group is conjugated with an ethylenic linkage in an allylic system of fragmental structure

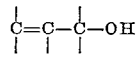

These allylic terpenic alcohols are produced according to the invention by the direct solvolysis of allylic terpenic halides with water. Hitherto it has been customary to carry out the conversion of such halides to the alcohols by a two-stage reaction in which the halides are first converted to a lower carboxylate ester such as the acetate and this ester has been saponified to produce the alcohol. This two-stage reaction is in principle uneconomic compared with the direct reaction of water as solvolytic medium as regards both materials and operating costs.

The reactions of the allylic terpenic halides are also often complicated by the tendency of the allylic terpenic systems to undergo various isomerisation reactions. Firstly, the system undergoes allylic transformation reactions according to the fragmental formulae:

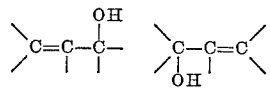

and secondly the terpenic structure may itself undergo more fundamental rearrangement. For example when myrcene (I) is reacted with 1 mole of hydrogen chloride there is produced the so-called myrcene hydrochloride. This is a mixture of myrcenyl chloride (II), linalyl chloride (III) and geranyl chloride (together with its geometric isomer, neryl chloride) (IV).

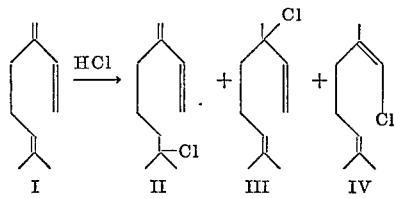

The proportion of myrcenyl chloride (II) can be minimised by carrying out the hydrohalogenation in the presence of a copper catalyst according to British Pat. 986,262 or British Pat. 953,200. The mixture of the allylic terpenic halides linalyl chloride (III) and geranyl (neryl) chloride (IV) has then been subjected to solvolysis or displacement with acetate ion to produce linalyl acetate and geranyl acetate. Catalysts are employed for this reaction and these catalysts can affect the allylic transformation so that, for example, when the chloride is reacted with sodium acetate in the presence of an amine catalyst as described in British Pat 979,523 the equilibrium is shifted to produce predominantly the geranyl and neryl acetates, whereas when the halide is solvolysed by acetic acid in the presence of a hydrogen chloride acceptor such as sodium acetate and a cuprous halide catalyst is employed as described in British Pat. 979,524 the product contains a greater proportion of the linalyl derivative. There is also always a tendency for some terpenic rearrangement to occur so that, for example, α-terpinyl chloride is formed from myrcene hydrochloride. This results in α-terpinyl esters and α-terpineol on saponification and, since α-terpineol is a relatively commonly available and cheap chemical in this field, its production is an economic loss.

On the other hand direct aqueous solvolysis of the halide compounds has hitherto been found to lead to a generally unacceptable degree of by-product formation. Such by-products may include hydrocarbons, ethers and cyclisation products such as α-terpineol. Moreover, where as in the case of myrcene hydrochloride, there is more than one possible isomeric product of hydrolysis the control of the ratio of the isomeric products is difficult.

It is seen therefore that the prior art processes for the production of geraniol and linalol are not entirely satisfactory and this is particularly so for linalol which being a tertiary alcohol is liable to suffer an elimination reaction leading to hydrocarbon by-products and which is not obtained in high yield even when the acetate solvolysis is catalysed by cuprous chloride.

It has now been discovered that allylic terpenic halides can be converted to allylic terpenic alcohols by direct solvolysis with water if this solvolysis is carried out in a hydrotropic solution of an aryl sulphonate. The solvolysis proceeds with preferential formation of the more substituted allylic isomer, i.e. a tertiary alcohol is formed in preference to a secondary alcohol, etc. While not so limited, the process is particularly useful for the solvolysis of myrcene hydrochloride to produce linalol. The process is also remarkably rapid at low temperatures which enables concurrent terpenic rearrangements leading to unwanted by-products to be minimised.

Accordingly, the present invention provides a process for the production of a $C_{10}$ allylic terpenic alcohol which comprises hydrolysing a $C_{10}$ allylic terpenic halide in an aqueous hydrotropic solution of a benzene—or alkylbenzene—sulphonate salt wherein each of any alkyl groups present does not contain more than 4 carbon atoms.

The term hydrotropic solution is used herein to denote an aqueous solution of sufficient concentration to cause specified organic polar substances which are normally sparingly soluble in water to become dissolved in the hydrotrope solution. In the present instance the sparingly water-soluble organic polar substances are the allylic terpenic halides. Hydrotropes should not be confused with surface-active, or emulsifying, agents since they do not lower the surface tension of water to any material extent. The hydrotropic salts for present use are the alkali metal and ammonium salts of benzene and alkylbenzene sulphonic acids, wherein each of any alkyl groups present does not contain more than 4 carbon atoms, for example the sodium, potassium or ammonium salts of benzene, toluene, cymene or xylene sulphonic acids. Preferred sulphonate salts for present use are those sodium xylene sulphonates sold under the registered trademark Eltesol.

The hydrotropic activity of hydrotropes is demonstrated only in concentrated aqueous solutions, i.e. usually those of at least 30% strength. The aqueous hydrotropic medium for present purposes therefore usually contains at least 30 parts by weight of hydrotrope per 100 parts by total weight of water and hydrotrope, but preferably it contains at least 40 parts by weight on this basis and an amount of 45–60 parts by weight is preferred. At least sufficient of the hydrotropic medium is present substantially to dissolve the allylic terpenic halide reactant so that the reaction mixture is essentially homogeneous.

The said allylic terpenic halide is preferably a linalyl, geranyl or neryl halide, often a mixture thereof obtained by the monohydrohalogenation of myrcene or ocimene and herein termed myrcene hydrohalide. The product obtained from such a mixture according to the invention normally comprises linalol as the major component with smaller proportions of geraniol (nerol), α-terpineol (which results from terpenic rearrangement) and myrcenol (which results from the non-allylic myrcenyl halides present in the original myrcene hydrohalide). However, the invention may aso be carried out on verbenyl chloride (resulting from allylic chlorination of α-pinene) to produce the tertiary alcohol 2-hydroxy-δ-pinene and its allylic isomer verbenol; carvyl chloride (resulting from allylic chlorination of limonene) to produce carvenol; 2-chloro-6-p-menthene (resulting from allylic chlorination of carbomenthene) to produce 2-hydroxy-6-p-menthene; 5-chloro-3-p-menthene (resulting from allylic chlorination of 3-p-menthene) to produce 5-hydroxy-3-p-menthene; 3-chloro-2, 6-dimethyl - 1,4,6 - octatriene (resulting from allylic chlorination of allo-ocimene) to produce 3-hydroxy-2,6-dimethyl-1,4,6-octatriene; 6 - chloro-8-hydroxy-1-p-menthene (resulting from allylic chlorination of α-terpineol) to produce 6,8-dihydroxy-1-p-menthene; 1-chloro-2-p-menthene and 4-chloro-2-p-menthene obtained as a mixture by monohydrohalogenation of α-terpinene to yield 1 - hydroxy-2-p-menthene, 4 - hydroxy-2-p-menthene and their allylic isomers piperitol and carvenol; 3-chloro-1,1,2,3 - tetramethyl - 4 - cyclohexene (obtained by allylic chlorination of α- or β-pyronene) to yield 3-hydroxy-1, 1,2,3-tetramethyl-4-cyclohexene and its allylic isomer 5-hydroxy-1,1,2,3-tetramethyl - 3 - cyclohexene; 3-chloro-2-methyl-6-methylene-1, 7-octadiene (obtained by allylic chlorination of myrcene) to yield 3-chloro-2-methyl-6-methylene-1,7-octadiene and its allylic isomer 1-hydroxy-2-methyl-6-methylene-2,7-octadiene; and dihydromyrcene chloride (obtained by allylic chlorination of dihydromyrcene) to yield 3-hydroxy-2,6-dimethyl-1,7-octadiene and its allylic isomer 1-hydroxy-2,6-dimethyl-2,6-octadiene.

The reaction mixture is preferably non-acidic and since the by-product of the solvolysis is a hydrohalic acid, the presence of a buffer or mild base is required to maintain the reaction mixture at pH 7 or above. The presence of sodium bicarbonate has been found very suitable for this purpose; calcium or magnesium carbonate may also similarly be used. More caustic alkalis are less suitable since best results are obtained when the reaction mixture has a pH of 7.5 to 9.0.

The present process is preferably carried out at a low temperature. Above 50° C. undue terpenic rearrangement is likely to occur and desirably the reaction is carried out at −30° C. to 20° C. The effect of acidity of the reaction mixture and the reaction temperature are interdependent and a low pH can more readily be tolerated at low temperatures. Thus if no hydrogen chloride acceptor is provided the reaction temperature shall be below 0° C. if undue side reactions are to be avoided. The reaction mixture is stirred with external cooling and the solvolysis usually requires from 2 to 6 hours or even longer depending on the particular reactivity of the terpenic halide to be solvolysed. If the pH is controlled by the presence of a carbonate or bicarbonate the completion of the reaction is conveniently denoted by cessation of carbon dioxide evolution. Surprisingly, the present process requires the presence of no further catalyst for the solvolysis and in particular we have found that the presence of cuprous halide has little or no effect on the reaction.

At the conclusion of the reaction the allylic terpenic alcohol is recovered from the reaction mixture by appropriate means, for example by suitable solvent extraction or by steam distillation. The hydrotropic medium can be recovered and reconcentrated for re-use.

The organic product obtained by the solvent extraction or steam distillation is then purified, for example by fractional distillation under vacuum or on a chromatographic column. The product usually contains a mixture of isomeric allylic alcohols together with by-products resulting from terpenic rearrangements or from impurities present in the allylic terpenic halide. However, the more highly substituted of the isomeric allylic alcohols usually predominates and accordingly the present invention is particularly effective for producing linalol from myrcene hydrohalide.

EXAMPLE 1

A mixture of crude myrcene hydrochlorides (1000 parts) water (1500 parts), sodium xylene sulphonate (1500 parts) and sodium bicarbonate (540 parts) was stirred at 0° C. until the evolution of carbon dioxide ceased (6 hours). The mixture was then stirred at 100° C. for 4 hours at which time the chloride content of the oil, was less than 0.2%. The product was worked up by steam distillation to give an oil (750 parts) having the following composition:

| | Parts |
|---|---|
| Linalol | 420 |
| α-Terpineol | 125 |
| Hydrocarbons | 140 |
| Other unidentified products | 60 |

EXAMPLE 2

The procedure of Example 1 was repeated at 20° C. The oil obtained had the following composition:

| | Parts |
|---|---|
| Linalol | 320 |
| Geraniol | 30 |
| α-Terpineol | 200 |
| Hydrocarbons | 145 |
| Other unidentified products | 65 |

This example illustrates the preference for carrying out the process at low temperatures in order to maximise the production of linalol, since at 20° C. increased terpenic rearrangement to produce α-terpineol occurred and some geraniol was also produced.

I claim:

1. The process for the production of $C_{10}$ allylic terpenic mono-alcohols by hydrolysing, at a temperature of not more than 50° C., a $C_{10}$ allylic terpenic mono-halide with water in a liquid hydrolysis mixture comprising (i) said terpenic halide, and (ii) an aqueous solution of a sulphonate salt selected from the group consisting of the alkali metal and ammonium salts of benzene and alkylbenzene sulphonic acids wherein each of any alkyl groups present contains from 1 to 4 carbon atoms, said aqueous solution containing at least 30 parts by weight of said sulphonate salt per 100 parts of total weight of water and said sulphonate salt, said hydrolysis mixture being maintained at a pH of from 7.5 to 9.0 by the use of a buffer or a mild base.

2. The process of claim 1 wherein the said allylic terpenic halide is selected from the group consisting of linalyl halides, geranyl halides, neryl halides and carvyl halides.

3. The process of claim 2 wherein the said sulphonate salt is selected from the group consisting of sodium, potassium and ammonium salts of benzene, toluene, cymene and xylene sulphonic acids.

4. The process of claim 3 wherein the said sulphonate salt is sodium xylene sulphonate.

5. The process of claim 4 wherein said temperature is from −30° C. to +20° C.; and wherein said pH is maintained by the inclusion of sodium bicarbonate in said hydrolysis mixture.

6. The process of claim 5 wherein said aqueous solution of said sulphonate salt contains 45–60 parts by weight of said sulphonate salt per 100 parts of total weight of water and said sulphonate salt.

7. The process of claim 6 wherein said terpenic halide is myrcene hydrochloride.

8. The process of claim 1 wherein said terpenic halide is myrcene hydrochloride.

9. The process of claim 8 wherein said sulphonate salt is selected from the group consisting of sodium, potassium and ammonium salts of benzene, toluene, cymene and xylene sulphonic acids.

10. The process of claim 9 wherein said temperature is from −30° C. to +20° C.

11. The process of claim 10 wherein said sulphonate salt is sodium xylene sulphonate; and wherein said pH is maintained by the inclusion of sodium bicarbonate in said hydrolysis mixture.

12. The process of claim 11 wherein said terpenic halide is myrcene hydrochloride.

13. The process of claim 1 wherein said terpenic halide is selected from the group consisting of linalyl halides, geranyl halides, neryl halides and carvyl halides; wherein said sulphonate salt is selected from the group consisting of sodium, potassium and ammonium salts of benzene, toluene, cymene and xylene sulphonic acids; and wherein said aqueous solution of said sulphonate salt contains at least 40 parts by weight of said sulphonate salt per 100 parts of total weight of water and said sulphonate salt.

14. The process of claim 13 wherein said aqueous solution of said sulphonate salt contains 45–60 parts by weight of said sulphonate salt per 100 parts of total weight of water and said sulphonate salt.

15. The process of claim 1 wherein said temperature is from −30° C. to +20° C.

16. The process of claim 15 wherein said terpenic halide is myrcene hydrochloride; and wherein said sulphonate salt is selected from the group consisting of sodium, potassium and ammonium salts of benzene, toluene, cymene and xylene sulphonic acids.

17. The process of claim 16 wherein said sulphonate salt is sodium xylene sulphonate.

18. The process of claim 17 wherein said aqueous solution of a sulphonate salt contains at least 40 parts by weight of said sulphonate salt per 100 parts of total weight of water and said sulphonate salt; and wherein said pH is maintained by the inclusion of sodium bicarbonate in said hydrolysis mixture.

19. The process of claim 1 wherein said sulphonate salt is sodium xylene sulphonate.

20. The process of claim 1 wherein said sulphonate salt is selected from the group consisting of the alkali metal and ammonium salts of alkylbenzene sulphonic acids.

References Cited
UNITED STATES PATENTS

| | | | |
|---|---|---|---|
| 2,313,767 | 3/1943 | Pollack et al. | 260—640 |
| 2,871,271 | 1/1959 | Booth | 260—640 |
| 2,995,600 | 8/1961 | Webb | 260—631.5 |
| 3,018,308 | 1/1962 | Levine et al. | 260—640 |
| 2,475,364 | 7/1947 | Griendt et al. | 260—640 |

OTHER REFERENCES

Lumb et al.: "Ind. & Eng. Chemistry," vol. 45 (1953), pp. 1086–1093.

Booth et al.: "Ind. & Eng. Chemistry," vol. 40 (1948), pp. 1491–1493.

Treybal: "Liquid Extraction," 2nd ed. (1963), pp. 50, 51, 53, 54.

LEON ZITVER, Primary Examiner

J. E. EVANS, Assistant Examiner

U.S. Cl. X.R.

260—640